United States Patent
Wirsching et al.

(10) Patent No.: US 7,982,154 B2
(45) Date of Patent: Jul. 19, 2011

(54) SORTING DEVICE AND METHOD FOR SORTING RFID TAGS

(75) Inventors: Tim Wirsching, Dresden (DE); Doris Kies, Dresden (DE); Dieter Bergmann, Dresden (DE)

(73) Assignee: Muehlbauer AG, Roding (DE)

( * ) Notice: Subject to any disclaimer, the term of this patent is extended or adjusted under 35 U.S.C. 154(b) by 154 days.

(21) Appl. No.: 12/306,320

(22) PCT Filed: Jun. 12, 2007

(86) PCT No.: PCT/EP2007/055753
§ 371 (c)(1),
(2), (4) Date: Apr. 28, 2009

(87) PCT Pub. No.: WO2007/147751
PCT Pub. Date: Dec. 27, 2007

(65) Prior Publication Data
US 2009/0206012 A1    Aug. 20, 2009

(30) Foreign Application Priority Data

Jun. 23, 2006 (DE) .......................... 10 2006 028 760

(51) Int. Cl.
*B07C 5/00* (2006.01)
(52) U.S. Cl. ...................... 209/571; 209/573; 209/923
(58) Field of Classification Search .................. 209/552, 209/571, 573, 912, 922, 923
See application file for complete search history.

(56) References Cited

U.S. PATENT DOCUMENTS

| | | | | |
|---|---|---|---|---|
| 4,907,701 A | * | 3/1990 | Kobayashi et al. | 209/576 |
| 5,807,066 A | * | 9/1998 | Smith | 414/802 |
| 6,104,291 A | * | 8/2000 | Beauvillier et al. | 340/572.1 |
| 6,147,662 A | * | 11/2000 | Grabau et al. | 343/895 |
| 6,237,217 B1 | * | 5/2001 | Bohn et al. | 29/806 |
| 6,280,544 B1 | | 8/2001 | Fox et al. | |
| 6,451,154 B1 | * | 9/2002 | Grabau et al. | 156/300 |
| 6,479,777 B2 | * | 11/2002 | Yamakawa | 209/574 |
| 6,645,327 B2 | * | 11/2003 | Austin et al. | 156/64 |
| 7,176,799 B1 | * | 2/2007 | Golicz et al. | 340/572.1 |
| 7,244,332 B2 | * | 7/2007 | Stromberg et al. | 156/301 |
| 7,278,203 B2 | * | 10/2007 | Aoyama et al. | 29/740 |
| 7,375,636 B1 | * | 5/2008 | Martin | 340/572.1 |
| 7,479,614 B2 | * | 1/2009 | Eastin | 209/573 |
| 2002/0195195 A1 | | 12/2002 | Grabau et al. | |
| 2003/0061947 A1 | | 4/2003 | Hohberger et al. | |
| 2004/0215350 A1 | | 10/2004 | Roesner | |
| 2007/0296554 A1 | * | 12/2007 | Marcus et al. | 340/10.51 |
| 2009/0297328 A1 | * | 12/2009 | Slocum, III | 414/806 |

FOREIGN PATENT DOCUMENTS

| | | |
|---|---|---|
| DE | 10310107 | 3/2003 |
| EP | 1096423 | 5/2001 |
| WO | 2006026661 | 3/2006 |

* cited by examiner

*Primary Examiner* — Joseph C Rodriguez
(74) *Attorney, Agent, or Firm* — John A. Miller; Miller IP Group, PLC

(57) ABSTRACT sorting device for RFID tags, comprising a dispensing unit for supplying RFID tags which are applied to a transport belt to a dispensing area, in which the RFID tags are detached from the transport belt; a pick-up unit having a plurality of transport units for respectively picking up the RFID tags in a respective pick-up area onto a corresponding transport belt of the transport units and a positioning device for positioning the dispensing area and a selected pick-up area with respect to one another so that the RFID tags detached from the transport belt in the dispensing area are picked up by the pick-up area of the selected transport unit.

11 Claims, 1 Drawing Sheet

SORTING DEVICE AND METHOD FOR SORTING RFID TAGS

PRIORITY CLAIM

This application is based on PCT/EP07/55753 filed Jun. 12, 2007 which claims priority to German Application Serial No. 10 2006 028 760.6 filed Jun. 23, 2006, contents of which are incorporated herein.

FIELD OF THE INVENTION

The invention relates to a sorting device for RFID tags and to a method for sorting RFID tags into a number of classes.

BACKGROUND

RFID tags, also known as RFID transponders, etc., are frequently used as a mass-produced product for identifying objects, in particular goods. The RFID tags used in this way must therefore be available in high numbers and are therefore usually produced in an automated manner in a mass production process. During the production process for the RFID tags, fluctuations in performance parameters occur, i.e. for example fluctuations in the range of the RFID tags or fluctuations in other performance features, so that the RFID tags thus produced may differ with regard to their fields of use. In other words, while RFID tags with good readability, i.e. with a large range, are required for one particular application, other tags which are produced in an identical manner and which have only a smaller range or poorer performance features may still be sufficiently suitable for another field of use.

The RFID tags are usually produced on a carrier belt, to which they are fixed by means of an easily soluble adhesive. On the carrier belt, the RFID tags are guided for test purposes through a test device, in order to check the performance features of each of the RFID tags after they have been produced and accordingly to classify their performance features.

SUMMARY

The present invention is directed to sorting the RFID tags, which are arranged one behind the other on a common carrier belt after testing, according to their performance features so that they can be provided separately on corresponding dedicated transport belts in each case.

This is achieved by the sorting device and by the method according to the independent claims of the present invention. Further advantageous embodiments of the invention are specified in the dependent claims.

According to a first aspect of the invention, a sorting device for RFID tags is provided. The sorting device comprises a dispensing unit for supplying RFID tags which are applied to a transport belt to a dispensing area, in which the RFID tags are detached from the transport belt; a pick-up unit having a plurality of transport units for respectively picking up the RFID tags in a respective pick-up area onto a corresponding transport belt of the transport units; and a positioning device for positioning the dispensing area and a selected pick-up area with respect to one another so that the RFID tags detached from the transport belt in the dispensing area are picked up by the pick-up area of the selected transport unit.

The sorting device according to the invention makes it possible to sort RFID tags in a continuous manufacturing process as a function of a selection that has been made, such as e.g. a classification of the RFID tags.

Preferably, a test device is provided, through which the transport belt runs before reaching the dispensing area so as to classify each of the RFID tags according to one parameter, wherein a control device is also provided for selecting the transport unit as a function of a result of the classification.

Furthermore, in time terms, the control device may carry out the positioning of the positioning device as a function of the result of the classification for a respective RFID tag in such a way that the positioning device positions the dispensing area and the pick-up area at a point in time such that the respective RFID tag is picked up by the transport belt of the selected transport unit.

According to a further embodiment, the dispensing unit has in the dispensing area a dispensing edge which can be positioned by the positioning device.

Preferably, a compensation device may be provided which, as a function of the selected position of the dispensing edge, compensates a displacement of the transport belt in the dispensing area which is brought about by the positioning of the dispensing edge.

In particular, the compensation device may comprise two dancer rolls which are coupled to one another and of which one is arranged in front of the dispensing unit and one is arranged behind the dispensing unit as seen in the transport direction of the transport belt, wherein the dancer rolls can move in a direction of displacement in order to compensate the displacement of the transport belt which is brought about by the positioning of the dispensing edge.

According to a further aspect of the present invention, a method for sorting RFID tags is provided. The method comprises the following steps: supplying RFID tags which are applied to a transport belt to a dispensing area, in which the RFID tags are detached from the transport belt; selecting one of a plurality of transport units for picking up the RFID tags in an associated pick-up area; positioning the dispensing area and the selected pick-up area with respect to one another so that the RFID tags detached from the transport belt in the dispensing area are picked up by the pick-up area of the selected transport unit.

Preferably, each of the RFID tags is classified according to one parameter, wherein the transport unit is furthermore selected as a function of a result of the classification.

In time terms, the positioning of the dispensing area and of the selected pick-up area may be carried out as a function of the result of the classification for a respective RFID tag in such a way that the positioning device positions the dispensing area and the pick-up area at a point in time such that the respective RFID tag is picked up by the transport belt of the selected transport unit.

A displacement of the transport belt in the dispensing area which is brought about by the positioning of the dispensing area may be compensated as a function of the selected position of the dispensing area.

BRIEF DESCRIPTION OF THE DRAWING

Preferred embodiments of the invention will be explained in more detail below with reference to the appended drawing.

DETAILED DESCRIPTION OF THE INVENTION

Figure 1:
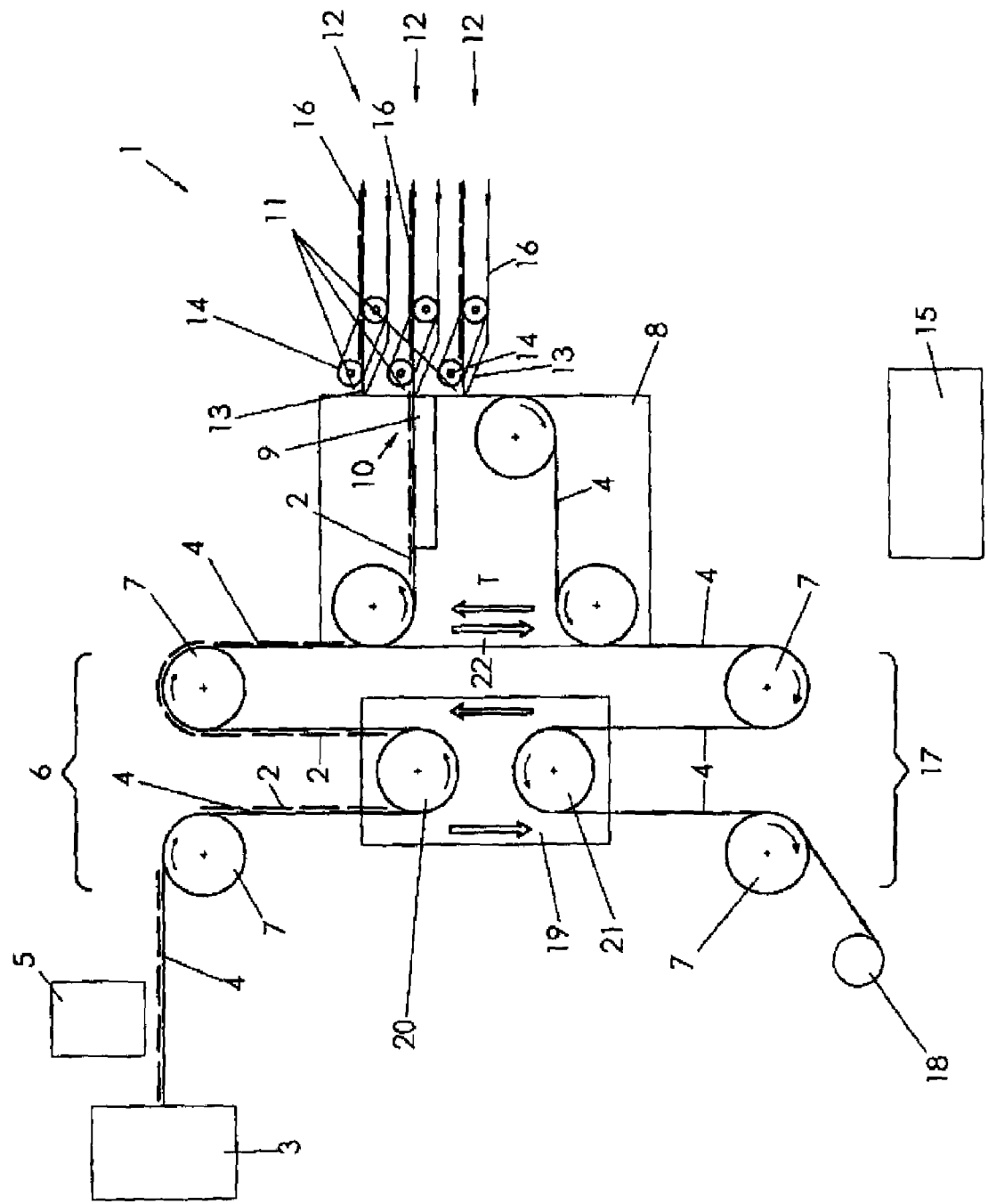

The single FIGURE shows a schematic diagram of a sorting device 1 according to the invention, by means of which RFID tags 2 located on a carrier belt 4 can be sorted according to their classification. The RFID tags 2 are produced in a manufacturing device 3 and are provided on the carrier belt 4, in particular a suitable tag belt. The RFID tags 2 are produced in an automated and known manner in the manufacturing device and are applied to the carrier belt 4 at a constant distance from one another.

From the manufacturing device 3, the carrier belt 4 runs through a test device 5, in which performance parameters of each of the RFID tags 2 located on the carrier belt 4 are checked and the corresponding RFID tag 2 is then classified so that each of the RFID tags 2 can be allocated to a specific quality class.

From the test device 5, the transport belt 4 with the RFID tags 2 is fed via a feed device 6, which comprises a plurality of deflection rolls 7, to a dispensing unit 8. The transport belt may be driven by one or more of the deflection rolls 7. In the dispensing unit 8, the transport belt 4 with the RFID tags 2 passes into a dispensing area 10, in which the transport belt 4 is guided over a dispensing edge 9 at a considerable angle, preferably at a right angle or at an acute angle, so that the RFID tags 2 located thereon detach from the transport belt 4 and thus pass from the dispensing area 10 into an adjacent pick-up area 11 of one of a plurality of transport units 12.

The pick-up areas 11 of the transport units 12 are arranged essentially adjacent to one another and have in their respective pick-up area 11 a pick-up tongue 13 and a pressure roller 14. Each of the transport units 12 is assigned to one performance class of RFID tags 2. The transport units 12 respectively guide a transport belt 16 for picking up the RFID tags provided in the dispensing area 10. The respective transport belt 16 is guided over the pick-up tongue 13 and, given a suitable positioning of the dispensing unit 8, can pick up there an RFID tag 2 which has been detached by the dispensing edge. The detached RFID tag 2 passes from the dispensing area 10 into the pick-up area 11 of the respective transport unit 12, and is detected by the pressure roller 14 and pressed onto the respective transport belt 16, so that the respective RFID tag adheres to the corresponding transport belt 16 as a result of the adhesive layer located either on the transport belt 16 or on the underside of the RFID tag 2.

The transport belts 16 of the respective transport units 12 are provided by a corresponding unwinding device (not shown) and, once the RFID tag of the corresponding quality class has been applied, are wound up onto a corresponding winding device (not shown).

The dispensing unit 8 is arranged such that it can be displaced on a carriage in a direction of displacement T essentially transversely to the transport directions of the transport belts 16 of the transport units 12, so that the dispensing area 10 can be positioned and aligned with respect to each of the pick-up areas 11 of the transport units 12. By means of a control unit 15, the carriage which carries the dispensing unit 8 is then positioned with respect to the transport units 12 in such a way that the RFID tag 2 located in the dispensing area 10 passes into the pick-up area 11 of that transport unit 12 for the quality class which corresponds to that of the respective RFID tag 2, which is determined by the test device 5. To this end, the control device 15 detects the temporal offset between the test device 5 and the pick-up area 11, so that the positioning of the dispensing unit 8 takes place according to the test result for the respective RFID tag when the latter reaches the dispensing area 8.

In order to avoid on the transport belts 16 of the respective transport units 12 any areas in which no RFID tags 2 are applied, the only transport belt 16 which is moved is that of the transport unit 12 relative to the pick-up area 11 of which the dispensing area 10 of the dispensing unit 8 is positioned, while the transport belts 16 of the other transport units 12 are stopped during this time. The control of the transport belts 16 of the transport units 12 in this regard likewise takes place by means of the control device 15. The control device 15 thus performs the functions of detecting the performance parameter and classifying the respective RFID tag, controlling the drive of the transport belt 4 through the dispensing unit 8, displacing the carriage which carries the dispensing unit 8, and in some cases controlling the carriage of the compensation device 19, and controlling the movement of the transport belts 16 of the transport units 12.

Once the transport belt 4 has been guided through the dispensing unit 8 over the dispensing edge 9, the RFID tags 2 are detached and the empty transport belt 4 is guided by a discharge device 17 via a plurality of deflection rolls 7 to a winding device 18, where the transport belt 4 is wound up for reuse or disposal.

Since a positioning of the dispensing unit 8 by displacing the carriage may lead to a change in length of the portion of the transport belt 4 between the test device 5 and the dispensing area 10, a compensation device 19 is provided on a displaceable carriage which, during a positioning of the dispensing unit 8, i.e. during a displacement of the carriage on which the dispensing unit 8 is arranged, carries out a compensation movement which can either be actively controlled by the control device 15 or is brought about by shortening the portion of the transport belt after or before the dispensing area. As a result, the compensation device 19 is moved in such a way that the length between the test device 5 and the dispensing area 10 essentially does not change, so that a correct assignment of an RFID tag located in the dispensing area 10 to a test result obtained in the test device 5 can take place in a defined manner.

The compensation device 19 comprises two dancer rolls 20, 21 which are coupled to one another in terms of their position and of which one is arranged on the portion of the transport belt 4 guided in the feed device 6 and the other is arranged on the portion of the transport belt 4 guided in the discharge device 17. The transport belt 4 is guided around the first dancer roll 20 in the feed device and around the second dancer roll 21 in the discharge device 17, wherein the length of the portion of the transport belt 4 can be increased in the feed device 6 and decreased in the discharge device 17, or vice versa, by a displacement movement of the compensation device 19.

In the illustrated example of embodiment, the compensation device 19 is designed in the form of a carriage on which the dancer rolls 20, 21 are arranged. The dancer rolls 20, 21 are arranged both in the feed device 6 and in the discharge device 17 between in each case two deflection rolls 7, the distance between which corresponds approximately to the diameter of the associated dancer rolls 20, 21, so that the transport belt changes direction by approximately 180° as it revolves around the dancer roll. In this way, the overall length of the transport belt 4 between the manufacturing device 3 and the winding device 18 remains essentially unchanged during the displacement of the compensation device 19.

One or more of the deflection rolls 7 may be provided as drive rollers, which move the transport belt 4 continuously through the sorting device 1. As an alternative, a discontinuous movement of the transport belt 4 is also possible, e.g. a step-by-step movement, which makes it possible for example for the RFID tag 2 to be tested in the test device 5 in a fixed resting position, so that the testing can take place under defined conditions. The step-by-step movement of the transport belt also makes it possible for the dispensing unit 8 to have sufficient time to assume a new position relative to the selected pick-up area 11 of the respective transport unit 12.

All of the features disclosed in the application documents are claimed as essential to the invention in so far as they are novel individually or in combination with respect to the prior art.

| List of references | |
|---|---|
| 1 | sorting device |
| 2 | RFID tags |
| 3 | manufacturing device |
| 4 | carrier belt |
| 5 | test device |
| 6 | feed device |
| 7 | deflection rolls |
| 8 | dispensing unit |
| 9 | dispensing edge |
| 10 | dispensing area |
| 11 | pick-up area |
| 12 | transport units |
| 13 | pick-up tongue |
| 14 | pressure roller |
| 15 | control device |
| 16 | transport belt |
| 17 | discharge device |
| 18 | winding device |
| 19 | compensation device |
| 20, 21 | dancer rolls |
| 22 | positioning device |
| T | direction of displacement |

The embodiments of the invention in which an exclusive property or privilege is claimed are defined as follows:

1. A sorting device for RFID tags, comprising:
   a dispensing unit for supplying RFID tags which are applied to a transport belt to a dispensing area, in which the RFID tags are detached from the transport belt;
   a pick-up unit having a plurality of transport units, each having a corresponding transport belt, for picking up the RFID tags in a respective pick-up area onto a corresponding transport belt of the transport unit;
   a positioning device for positioning the dispensing area and a selected pick-up area with respect to one another so that the RFID tags detached from the transport belt in the dispensing area are picked up by the pick-up area of the selected transport unit;
   a test device through which the transport belt runs before reaching the dispensing area configured to classify each of the RFID tags according to one parameter; and
   a control device for selecting the transport unit as a function of a result of the classification.

2. The sorting device according to claim 1, wherein the control device carries out the positioning of the positioning device as a function of the classification for a respective RFID tag in such a way that the positioning device positions the dispensing area and the pick-up area at a point in time such that the respective RFID tag is picked up by the transport belt of the selected transport unit.

3. The sorting device according to claim 1, wherein the dispensing unit has in the dispensing area a dispensing edge which can be positioned by the positioning device.

4. The sorting device according to claim 3, further comprising a compensation device which, as a function of the selected position of the dispensing edge, compensates a displacement of the transport belt in the dispensing area which is brought about by the positioning of the dispensing edge.

5. The sorting device according to claim 4, wherein the compensation device comprises two dancer rolls which are coupled to one another and of which one is arranged in front of the dispensing unit and one is arranged behind the dispensing unit as seen in the transport direction of the transport belt, wherein the dancer rolls are configured to move in a direction of displacement in order to compensate the displacement of the transport belt resulting from the positioning of the dispensing edge.

6. A method for sorting RFID tags, comprising:
   supplying classified RFID tags which are applied to a transport belt to a dispensing area, in which the RFID tags are detached from the transport belt;
   selecting one of a plurality of transport units for picking up the RFID tags in an associated pick-up area; and
   positioning the dispensing area and the selected pick-up area with respect to one another so that the RFID tags detached from the transport belt in the dispensing area are picked up by the pick-up area of the selected transport unit.

7. The method according to claim 6, wherein the transport unit is selected as a function of the classification of the RFID tag.

8. The method according to claim 7, wherein positioning the dispensing area and the selected pick-up area positions the dispensing area and the pick-up area at a point in time such that the respective RFID tag is picked up by the transport belt of the selected transport unit.

9. The method according to claim 6, wherein:
   positioning the dispensing area and the selected pick-up area results in a displacement of the transport belt in the dispensing area; and
   the displacement of the transport belt in the dispensing area is compensated as a function of the selected position of the dispensing area.

10. A sorting device for RFID tags, comprising:
    a dispensing unit for supplying RFID tags which are applied to a transport belt to a dispensing area, in which the RFID tags are detached from the transport belt;
    a pick-up unit having a plurality of transport units for respectively picking up the RFID tags in a respective pick-up area onto a corresponding transport belt of the transport units;
    a positioning device for positioning the dispensing area and a selected pick-up area with respect to one another so that the RFID tags detached from the transport belt in the dispensing area are picked up by the pick-up area of the selected transport unit, wherein the dispensing unit has in the dispensing area a dispensing edge which can be positioned by the positioning device; and
    a compensation device which, as a function of the selected position of the dispensing edge, compensates a displacement of the transport belt in the dispensing area which is brought about by the positioning of the dispensing edge.

11. The sorting device according to claim 10, wherein the compensation device comprises two dancer rolls which are coupled to one another and of which one is arranged in front of the dispensing unit and one is arranged behind the dispensing unit as seen in the transport direction of the transport belt, wherein the dancer rolls are configured to move in a direction of displacement in order to compensate the displacement of the transport belt resulting from the positioning of the dispensing edge.

* * * * *